Feb. 3, 1970    J. E. FINAN    3,493,703
BODY MOTION SENSITIVE ELECTRICAL SWITCH WITH LOST MOTION MEANS
Filed Aug 2, 1968    2 Sheets-Sheet 1
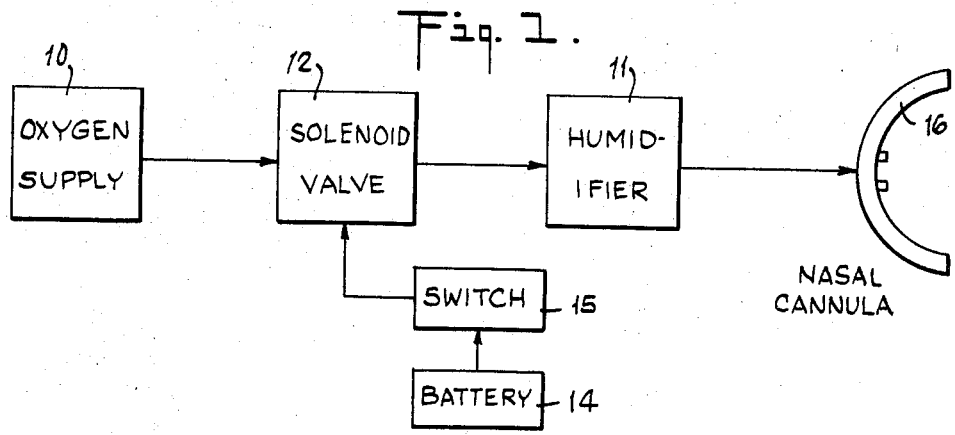
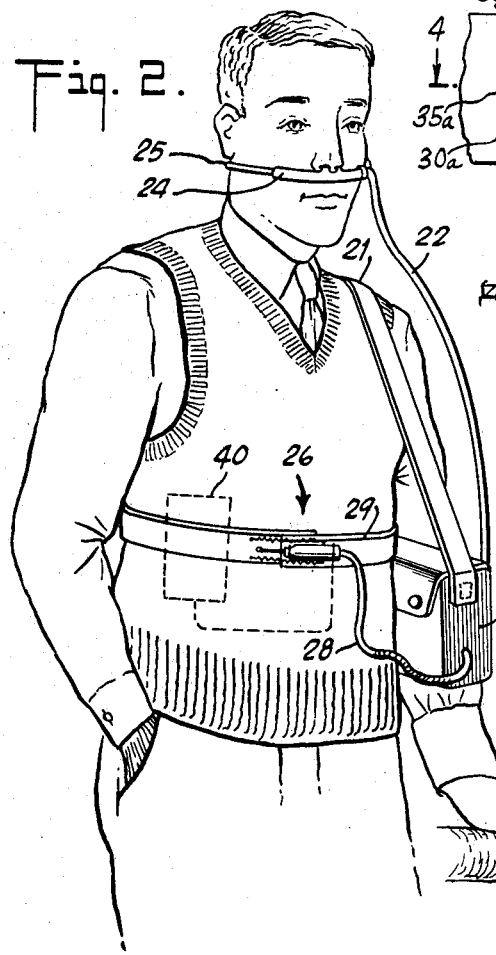
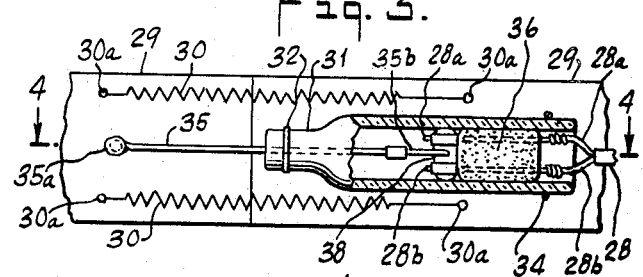
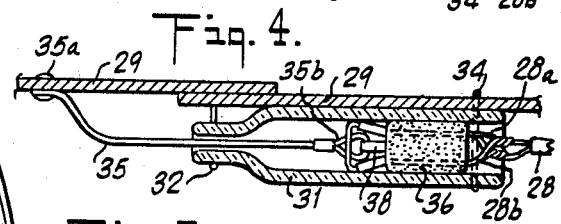
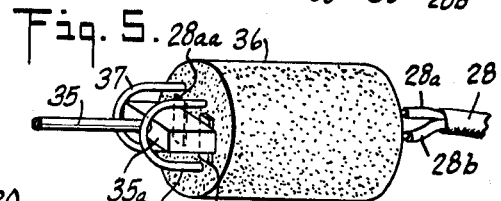
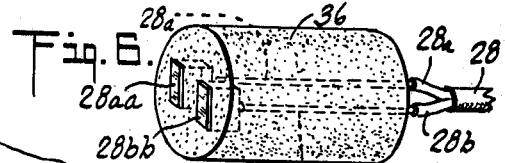
INVENTOR.
JAMES E. FINAN
BY
Thomas F. Moran
ATTORNEY Feb. 3, 1970  J. E. FINAN  3,493,703
BODY MOTION SENSITIVE ELECTRICAL SWITCH WITH LOST MOTION MEANS
Filed Aug 2, 1968  2 Sheets-Sheet 2
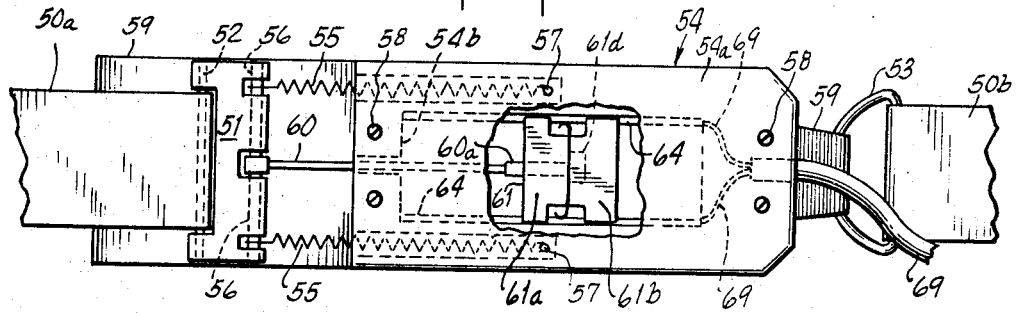
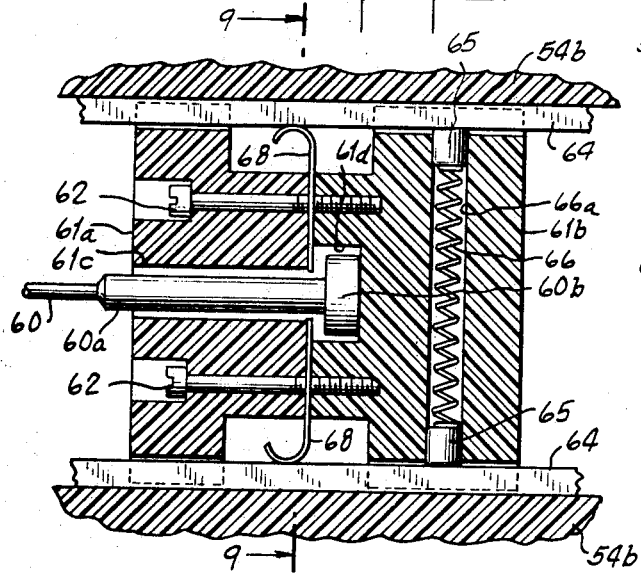
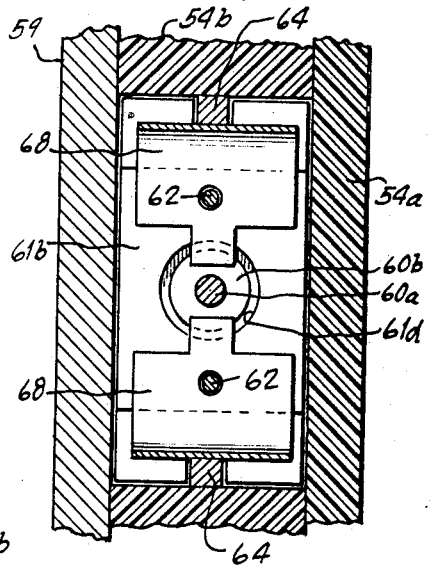
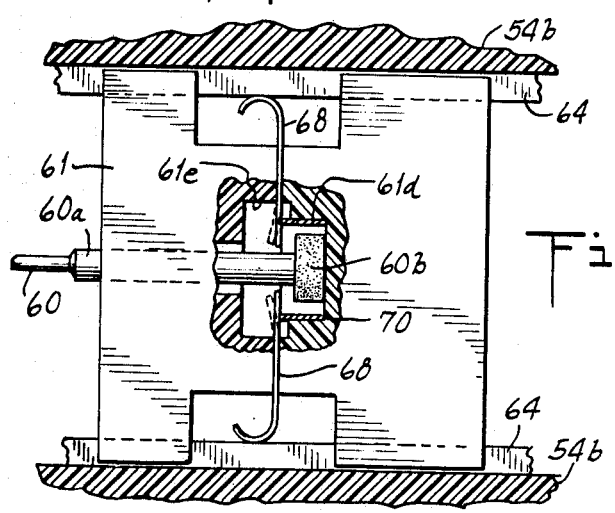
INVENTOR.
JAMES E. FINAN
BY
Thomas F. Moran
ATTORNEY

United States Patent Office 3,493,703
Patented Feb. 3, 1970

3,493,703
BODY MOTION SENSITIVE ELECTRICAL SWITCH
WITH LOST MOTION MEANS
James E. Finan, 1193 Hardscrabble Road,
Chappaqua, N.Y. 10514
Continuation-in-part of application Ser. No. 479,128,
Aug. 12, 1965. This application Aug. 2, 1968, Ser.
No. 749,776
Int. Cl. H01h 3/54
U.S. Cl. 200—153                                    8 Claims

ABSTRACT OF THE DISCLOSURE

An electric switch capable of being biased normally closed or normally open is provided by two electrical conductors which are spaced from each other and making up an electric circuit. An electrical conducting means is positioned and adapted with respect to said conductors to be in contact with said conductors to complete the electric circuit or to be spaced from said conductors to open or break the electric circuit. The electrical conductors are supported by a supporting body which is disposed within a surrounding structure in sliding relationship therein. Actuating means are associated with the electric switch the move the electrical conducting means in one direction into contact or out of contact with said electrical conductors to complete or open, respectively, said electric circuit and upon continued movement in said one direction to move said electrical conductors together with said supporting body in said one direction within said surrounding structure. The actuating means are also positioned and adapted for movement in another direction, substantially opposite to said one direction, to move said electrical conducting means in said other direction away from or into contact with said conductors to open or complete, respectively, said electric circuit and upon continued movement in said other direction to move said supporting body together with said electrical conductors in said other direction within said surrounding structure.

---

This application is related to and is a continuation-in-part of my copending application Ser. No. 479,128 filed Aug. 12, 1965, now U.S. Patent 3,400,712. Further, this application is related to my copending application Ser. No. 586,278 filed Oct. 12, 1966, now U.S. Patent 3,400,713, which, in turn, is a continuation-in-part of my above-identified application Ser. No. 479,128.

This invention relates to electric switches and to electric circuits incorporating such switches. In accordance with one embodiment this invention is directed to an electric switch which is biased in a normally closed position so that an electric circuit containing such a switch is normally closed or complete. In accordance with another embodiment this invention is directed to a switch which is biased in the normally open position with the result that an electric circuit containing such a switch is normally open.

Further, in accordance with special embodiments of this invention there are disclosed systems and apparatus capable of being worn on the person and useful for assisting persons wearing such apparatus in their breathing process, such as by supplying a stream of oxygen only during inhalation or by tightening or otherwise exerting a force upon the chest or diaphragm only during exhalation so as to assist the person wearing such apparatus in exhaling.

Various electric circuits, devices and switches are known and employed to open or close an electric circuit. For the most part, however, such switches and devices have not been completely satisfactory, especially when embodied in apparatus adapted and designed to be worn on the person. Either such switches and devices employing the same have been too sensitive, particularly with respect to body movement, or have been too complicated and/or cumbersome for normal everyday use.

It is an object of this invention to provide a simple, effective electric switch capable of being biased in the normally open or normally closed position.

It is another object of this invention to provide an electric switch simple in construction and operation and particularly useful in association with portable breathing devices and other such devices designed to assist persons in breathing.

How these and other objects of this invention are accomplished will become apparent in the light of the accompanying disclosure and drawings wherein:

FIG. 1 schematically indicates a system for supplying oxygen to a person only during inhalation and employing a switch in accordance with this invention;

FIG. 2 schematically illustrates a portable breathing device or system embodying a switch in accordance with this invention;

FIG. 3 is a plan view of an electric switch in accordance with this invention;

FIG. 4 is a cross sectional view taken through line 4—4 of FIG. 3;

FIGS. 5 and 6 are perspective views of certain operative components of a normally closed electric switch in accordance with this invention;

FIG. 7 is a plan view in partial cross section of another embodiment of a switch in accordance with this invention;

FIG. 8 is a cross sectional view of a normally open switch in accordance with this invention;

FIG. 9 is a cross sectional view taken along line 9—9 of FIG. 8; and

FIG. 10 is a plan view in partial cross section of a normally closed switch in accordance with this invention.

In accordance with this invention there is provided an electric switch adapted to complete or open an electric circuit which comprises at least two electrical conductors spaced from each other and forming part of the electric circuit. Electrical conducting means are provided and positioned and adapted with respect to the electrical conductors to be brought into contact with said electrical conductors to complete the electric switch or to be moved out of contact with said conductors to open or break said electric circuit. The electrical conductors are supported by a supporting body which is positioned within a surrounding structure in sliding relationship therein, such as in a piston-cylinder relationship. Actuating means are provided to move said electrical conducting means in one direction, such as into contact with said electrical conductors to complete said electric circuit and upon continued movement in said one direction to move said electrical conductors together with said supporting body in said one direction within said surrounding structure. The actuating means are also positioned and adapted upon movement in another direction, substantially opposite from said one direction, such as in a direction to move said electrical conducting means away from said conductors to open or break said electric circuit and upon continued movement in said other direction to move said supporting body together with said electrical conductors in said other direction within said surrounding structure.

Referring now to FIG. 1, there is schematically illustrated a system and/or apparatus embodying an electric switch in accordance with this invention, the system being suitable for supplying oxygen to a person wearing or using the apparatus only during inhalation.

As illustrated in FIG. 1, there is provided a source of oxygen 10, such as an oxygen tank together with conventional pressure reduction and flow control valves and equipment. Optionally, there is associated with this invention a humidifying device or humidifier 11 for humidifying the gaseous oxygen issuing from oxygen supply 10 just before it is dispensed to the user. The dispensed gaseous oxygen is arranged to flow through a valving device such as solenoid valve 12. Solenoid valve 12 is adapted to be open or closed to permit the flow or interruption of the flow of oxygen therethrough depending upon whether or not the electric circuit actuating solenoid valve 12 is opened or closed.

Operation of solenoid valve 12 is effected by means of a suitable electrical power source, such as battery 14, and electric switch 15. When switch 15 is closed solenoid valve 12 is opened and permits the flow of oxygen to a suitable dispensing means, such as nasal cannula 16. When switch 15 is open the flow of current from battery 14 to solenoid valve 12 is interrupted and solenoid valve 12 is closed thereby shutting off the flow of oxygen to nasal cannula 16.

Electric switch 15 in this illustrated embodiment of the invention is biased normally open such that the supply of oxygen to nasal cannula 16 is intermittent and on demand only during inhalation, i.e. when the person wearing or employing the system and/or apparatus is inhaling.

Referring now to FIG. 2 which illustrates generally a portable oxygen dispensing system or apparatus, there is illustrated container 20 suspended from one shoulder of the person wearing the same by means of shoulder strap 21. Container 20 is provided with an oxygen source, such as a small oxygen tank, together with an associated humidifying device and battery and solenoid valve, all not shown but suitably disposed within container 20. Conduit or tubing 22 leads from container 20 to nasal cannula 24 which is held in place on the face of the person by means of adjustable strap 25.

Tubing 22 is in fluid communication with oxygen source within container 20 and the humidifying device and the solenoid valve therein for the dispensing of oxygen to nasal cannula 24. The solenoid valve within container 20 is actuated by means of a switch, generally indicated by reference numeral 26, which is biased normally open and is in electrical contact with the battery and solenoid valve within container 20 by means of wire or conductor 28.

As illustrated in FIG. 2 switch 26 is positioned and adapted to be worn on the torso of the person by means of belt 29 which encircles the body at about the waist.

During inhalation the diaphragm expands causing normally open switch 26 to close thereby completing the electric circuit and opening the solenoid valve within container 20 to permit the flow of oxygen from the oxygen source therein via tubing 22 to nasal cannula 24 for inhalation by the wearer. During exhalation the waist of the person wearing the apparatus tends to contract thereby permitting switch 26 to return to its biased normally open position, breaking the electric circuit comprising the solenoid valve and shutting off the flow of oxygen from the oxygen source within container 20 via tubing 22 to nasal cannula 24.

Referring now to FIGS. 3 and 4 which show in detail a biased normally open switch in accordance with this invention suitable for use in the breathing apparatus illustrated in FIG. 2, the ends of belt 29 are held together by means of springs 30. Belt 29 is adapted, as illustrated, to encircle the waist of the wearer and is fastened to the wearer by means of an adjustable buckle, not shown. Springs 30 are fastened to belt 29 by rivets 30a. The switch is made up of an outer, substantially bottle-shaped shell or body 31 of suitable material, such as glass or plastic. The neck portion of switch body 31 is fastened to belt 29 by means of clip 32 and the cylindrical portion of switch body 31 is fastened to belt 29 by means of clip 34.

Member 35, such as a stiff wire, is fastened at one end to belt 29 by rivet 35a and is disposed within switch body 31 and slidably fitted therein. The other end of stiff wire 35 within switch body 31 is formed into loop 35b. Conductor 28 is disposed to pass through cylinder plug 36 slidably disposed within switch body 31. Plug 36 is desirably made of insulating material and is fairly closely fitted within switch body 31 so that sufficient friction is present between plug 36 and switch body 31 so that plug 36 does not tend to chatter or move within switch body 31 unless positively moved by stiff wire 35.

Electrically conductive elements 28a and 28b of conductor 28 enter one end of plug 36 and pass therethrough. At the other end of plug 36 the insulating material is stripped from elements 28a and 28b and the bare metallic electrically conductive elements are formed into separate loops. Positioned within loops 28a and 28b is bar 38 of suitably electrically conductive material such as copper. Bar 38 is fastened to stiff wire 35 with the result that stiff wire 35 at loop portion 35b thereof together with bar 38 forms a lost motion connection with respect to plug 36 and electrically conductive loop elements 28a and 28b.

In operation, and in the manner described with respect to FIG. 2, as the person wearing the apparatus inhales belt 29 is expanded against springs 30 and stiff wire 35 moves bar 38 into contact with bare metallic elements 28a and 28b of conductor 28 thereby closing the electric circuit to permit actuation of the solenoid valve to dispense oxygen via tubing 22 to nasal cannula 24 for inhalation. Upon continued expansion during breathing plug 36 with conductor 28 and its associated elements move within switch body 31 toward the neck end thereof under the urging or pull of stiff wire 35. Upon completion of inhalation and at the start of exhalation the abdomen contracts with the result that belt 29 also contracts. As belt 29 contracts and under the urging of the springs 30, bar 38 fixed to stiff wire 35 is moved out of contact with metallic elements 28a and 28b and is pushed against plug 36. Stiff wire 35 moves plug 36 away from the neck end portion of switch body 31. As bar 38 is moved out of contact with elements 28a and 28b, the electric circuit is broken and the solenoid valve closed thereby interrupting the flow of oxygen to the nasal cannula.

It is thus seen that there is provided a switch, as illustrated in FIGS. 3 and 4, operative to open the solenoid valve to permit the flow of oxygen during inhalation only and to close the solenoid valve and to prevent the flow of oxygen when exhalation is commenced.

Referring now to FIGS. 5 and 6, there is shown in perspective view certain components useful in a biased normally closed electric switch in accordance with this invention. Plug 36, similar to plug 36 in FIGS. 3 and 4, is provided with conductor elements 28a and 28b embedded therein. These conductive elements terminate at the face of one end of plug 36 to present conductive surfaces 28aa and 28bb, respectively. Stiff wire 35 is provided at its end with block 35a of electrically conductive material, such as copper. Additionally, loops 37 of suitable non-conductive material are provided fixed to plug 36 to contain and restrain block 35a in close relationship to the conductive surfaces 28aa and 28bb of plug 36. When plug 36 and the associated elements illustrated in FIGS 5 and 6 are substituted within the switch structure illustrated in FIGS. 3 and 4 there results a biased normally closed electric switch. In such a switch springs 30 urge stiff wire 35 and conductive block 35a into contact with the conductive surfaces 28aa and 28bb exposed at the end of plug 36 with the result that the electric circuit comprising conductor 28 and conductive elements 28a and 28b would be closed or completed. However, upon expansion of belt 29 stiff wire 35 would move conductor block 35a away from contact with conductive surfaces 28aa and 28bb thereby opening or breaking the electric circuit, and upon continued expansion of belt 29 and movement of stiff wire 35 block 35a comes into contact with loops 37 and would then carry with it plug 36 as belt 29 continues to expand.

A biased normally closed electric switch as indicated in FIGS. 5 and 6 would be particularly useful to actuate a device to exert a pressure or force upon the chest of the wearer during exhalation so as to assist in exhalation. This pressure or force would, however, be released or discontinued when the wearer starts to inhale since upon inhalation stiff wire 35 would move conductor block 35a away from conductive surfaces 28aa and 28bb and break the circuit.

An arrangement embodying a biased normally closed switch in accordance wtih this invention for use in an apparatus for exerting pressure or force upon the chest of a wearer during exhalation is indicated in dashed outline in FIG. 2. In dashed outline there is schematically illustrated at 40 a device controlled when switch 26 is closed to tighten belt 29 thereby exerting a force upon the chest of the wearer to assist in exhalation. When, however, the wearer starts to inhale switch 26 would be opened discontinuing the exerted force by device 40 through belt 29 upon the chest of the wearer and permitting the wearer to inhale but effective, when the wearer starts to exhale and upon closing of switch 26, to again tighten belt 29 by means of device 40 around the chest of the wearer to assist the wearer in exhaling.

Referring now to FIGS. 7, 8 and 9, there is illustrated therein another embodiment of a switch in accordance with this invention, the switch being biased in the open position. The switch, as illustrated, is adapted to be fixed onto a belt to be worn around the body. Belt end 50a of belt 50 is fastened to switch body 51 by means of pin 52 extending therethrough and belt end 50b is fastened to carrier plate 59 by means of ring 53. Switch body 51 is pulled toward and into contact with cooperating switch housing 54 by means of springs 55. One end of each of springs 55 is fixed to switch body 51 by means of bar 56 and the other end of each of springs 55 are fixed to housing 54 by means of pins 57. Housing 54 is made up of a top face or housing cover piece 54a and a bottom housing piece 54b, the top and bottom housing pieces 54a and 54b being fastened together and to carrier plate 59 by screws 58.

FIG. 7 illustrates the biased normally open switch in accordance with this invention in a condition where the switch is closed due to expansion of belt 50 and resulting movement of switch body 51 along carrier plate 59 away from switch housing 54. FIGS. 8 and 9 illustrate in greater detail the switch in its biased normally open position.

Switch body 51 is provided with stiff member 60 which is pivotally fixed at one end to bar 56. The other end of stiff member 60 operatively carries actuating member 61. Actuating member 61, shown in greater detail in FIG. 8, is made up of two bodies 61a and 61b, preferably made of nonelectrically conductive plastic material, which are joined together by means of screws 62. Actuating member 61 is slidably positioned within a cut-out portion of bottom housing piece 54b. Similarly, springs 55 are likewise positioned within cut-out portions of bottom housing piece 54b, all as illustrated in FIG. 7.

Bottom housing piece 54b is also provided with conductor bars 64 in the side walls thereof in the cut-out portion of bottom housing piece 54b whrein actuating member 61 is slidably positioned and which provides a pathway for actuating member 61 in substantially piston-cylinder relationship within housing 54.

As illustrated in FIG. 8 frictional members or buttons 65 are urged into contact with conductors 64 by means of spring 66 positioned within channel 66a within actuating member body 61b to provide for a snug, firm fit and movement of actuating member 61 within the cut-out portion of bottom housing piece 54b of housing 54. A lost motion connection is provided between switch body 51 and actuating member 61 via stiff member 60 which is fitted with an enlarged portion 60a slidably positioned within channel 61c of actuating member body 61a and which carries at its end electrically conductive head or button 60b operative within cylindrical cut-out portion 61d in actuating member body 61b. The height of button 60b is smaller than the depth or length of cut-out portion 61d to provide for limited back and forth movement of button 60b therein.

Actuating member bodies 61a and 61b have positioned therebetween electrically conductive spring members 68 which are maintained at one end in rubbing, sliding contact with conductors 64 and which are positioned at the other end within cut-out portion 61d of actuating member body 61b.

Conductors 64 are in electrical contact with electrical lead 69 which enters housing 54 at one end thereof, the electrical leads 69 being fixed to conductors 64 by suitable means, such as soldering, so as to provide therebetween a firm reliable electrical connection.

As illustrated in FIG. 8 the electric circuit comprising conductors 64 and spring members 68 is broken or opened. When, however, switch body 51 is moved to the left, as illustrated in FIG. 7, stiff member 60 moves its electrically conductive head 60b into contact with electrically conductive springs 68 to close or complete the electric circuit between conductors 64. Upon continued movement of switch body 51 to the left stiff member 60 together with head 60b will move or carry with it actuating member 61 within housing 54. When, however, movement of switch body 51 to the left ceases and contraction of belt 50 commences with resultant movement of switch body 51 to the right stiff member 60 will immediately move conductive button 60b out of contact with electrically conductive springs 68 and break the electrical connection between conductors 64. Upon continued movement of switch body 51 to the right stiff member 60 will move button 60b to the right into contact with actuating member body 61b and upon contact therewith will move actuating member 61 to the right while at the same time electrical conductive springs 68 are maintained in electrical contact with conductors 64 as actuating member 61 slidably moves within housing 54.

As illustrated in FIG. 8, electrically conductive button 60b operation in its to and fro movement within cylinder cut-out portion 61d of actuating member body 61b serves as a lost motion connection with all its attendant advantages between switch body 51 and actuating member 61.

FIG. 10 shows a switch in accordance with another embodiment of this invention wherein the switch is biased normally closed. The reference numerals used with respect to the switch illustrated in FIGS. 7, 8 and 9 are also used to identify substantially the same operative or component parts of the switch of FIG. 10. Like the switch illustrated in FIGS. 7, 8 and 9, the biased normally closed switch of FIG. 10 includes a lost motion connection made up of button 60b operative within cylindrical well 61d within actuating member 61. The switch of FIG. 10, however, is biased normally closed since cylindrical well 61d is fitted with a cylindrical electrically conductive metal liner 70 which serves to electrically connect conductors 64 via springs 68. Electrical contact between conductors 64 is broken by movement of stiff member 60 and 60a to the left bringing button 60b of non-conductive material into contact with springs 68 to move springs 68 out of contact with metal sleeve or liner 70 into well 61e. Upon continued movement of member 60 to the left actuating member 61 would also be moved to the left. Aside from being biased normally closed and the structural differences illustrated in FIG. 10, the switch of FIG. 10 is operative in substantially the same manner as the switch illustrated in FIGS. 7, 8 and 9. Accordingly, once movement of member 60 to the left has stopped and movement to the right has been commenced, button 60b permits springs 68 to return to contact metal liner 70 to electrically connect conductors 64 and close the switch. Upon continued movement to the right, after button 60b has reached the end of well 61d, actuating member 61 would then be moved to the right.

As indicated hereinabove the electrical switches of this invention have many and varied uses. The biased normally closed switch is particularly useful in a breathing device for the intermittent supply of oxygen only during inhalation by a person using a breathing apparatus embodying such a switch. The biased normally closed switch is particularly useful in a breathing assistance apparatus wherein pressure or other suitable force is exerted on the chest of a person using the apparatus during exhalation. With the biased normally closed switch in such an apparatus force would be exerted upon the chest of the wearer or user only during exhalation and immediately upon inhalation the switch would be opened and would permit the user to breath freely with substantially no interference but once exhalation had been started the switch would be closed and pressure would again be exerted upon the chest of the user to assist in exhalation.

Very many other uses of the switches in accordance with this invention are possible, such as to operate a respirator or resuscitator upon command or a breathing signal from the patient. Further, many devices, mechanical, electro-mechanical and electrical in nature, can be advantageously operated by a switch in accordance with this invention.

As will be apparent to those skilled in the art in the light of the foregoing disclosure, many modifications, substitutions and alterations are possible in the practice of this invention without departing from the spirit or scope thereof.

I claim:

1. An electrical switch adapted to complete or to open an electric circuit which comprises at least two electrical conductors spaced from each other and forming part of said electric circuit, electrical conducting means positioned and adapted with respect to said conductors to be brought into contact with said electrical conductors to complete said electric circuit or to be moved away from contact with said conductors to open or break said electric circuit, said electrical conductors being supported by and extending through a supporting body, said supporting body being provided within a surrounding structure in substantially piston-cylinder relationship and actuating means adapted to move said electrical conducting means in one direction into contact with said electrical conductors to complete said electric circuit and upon continued movement in said one direction to move said electrical conductors together with said supporting body in said one direction within said surrounding structure, said actuating means being positioned and adapted upon movement in another direction, substantially opposite from said one direction, to move said electrical conducting means in said other direction away from said conductors to open or break said electric circuit and upon continued movement in said other direction to move said supporting body together with said electrical conductors in said other direction within said surrounding structures.

2. An electrical switch adapted to maintain an electric circuit in a normally closed condition or to open said electric circuit which comprises at least two electrical conductors spaced from each other and forming part of said electric circuit, electrical conducting means positioned and biased in one direction with respect to said conductors to be maintained in contact therewith to complete said electric circuit, said electrical conducting means also being adapted to be moved away from said conductors in another direction to open or break said electric circuit, said electrical conductors being supported by and extending through a supporting body, said supporting body being provided within a surrounding structure in substantially piston-cylinder relationship, actuating means adapted to move said electrical conducting means in said other direction from its biased position in contact with said electrical conductors to open said electric circuit and upon continued movement in said other direction to pull said electrical conductors together with said supporting body in said one direction within said surrounding structure, said actuating means being positioned and adapted upon movement in one direction to bring said electrical conducting means into biased contact with said conductors to close or complete said electric circuit and upon continued movement in said one direction to push said supporting body together with said electrical conductors in said other direction within said surrounding structure.

3. An electrical switch adapted to maintain an electric circuit in a normally open condition or to close said electric circuit which comprises at least two electrical conductors spaced from each other and forming part of said electric circuit, electrical conducting means positioned and biased in one direction with respect to said conductors to be maintained out of contact with said electrical conductors to maintain said electric circuit open, said electrical conducting means also being adapted to be moved in another direction toward said conductors to complete or close said electric circuit, said electrical conductors being supported by and extending through a supporting body, said supporting body being provided within a surrounding structure in substantially piston-cylinder relationship, actuating means adapted to move said electrical conducting means in said one direction out of contact with said electrical conductors to maintain open said electric circuit and upon continued movement in said one direction to move said electrical conductors together with said supporting body in said one direction within said surrounding structure, said actuating means being positioned and adapted upon movement in said other direction to move said electrical conducting means toward and into contact with said conductors to close said electric circuit and upon continued movement in said other direction to move said supporting body together with said electrical conductors in said other direction within said surrounding structure.

4. An electrical switch in accordance with claim 1 wherein said actuating means comprises a lost motion connection.

5. An electrical switch in accordance with claim 2 wherein said actuating means comprises a lost motion connection.

6. An electrical switch in accordance with claim 3 wherein said actuating means comprises a lost motion connection.

7. An electrical switch adapted to complete or to open an electric circuit which comprises at least two electrical conductors spaced from each other and forming part of an electric circuit, electrical conducting means positioned and adapted with respect to said conductors to be in contact with said conductors to complete said circuit or to be spaced from said conductors so that said electric circuit is open, said electrical conductors being supported by a supporting said supporting body being provided within an enclosing structure in sliding relationship therein and actuating means adapted to move said electrical conducting means in one direction into contact with said electrical conductors to complete said electric circuit and upon continued movement in said direction to move said electrical conductors together with said supporting body in said one direction within said enclosing structure, said actuating means being provided and adapted upon movement in another direction, substantially opposite from said one direction, to move said electrical conducting means in said other direction away from said conductors to open or break said electric circuit and upon continued movement in said other direction to move said supporting body together with said electrical conductors in said other direction within said enclosing structure.

8. Apparatus comprising a belt adapted to be worn on the body and to encircle a portion of the body, such as the chest or abdomen, said belt being responsive to the motion of that portion of the body encircled by said belt such that said belt expands or is stretched if that portion of the body expands or the belt contracts if that portion of the body contracts, an electrical switch mounted on said belt, said belt being operative to open or to close an electrical circuit in response to the motion of that portion of the body encircled by said belt, said switch incorporating a lost motion connection between said belt and said switch, said lost motion connection being fixed at one end to said belt and associated with said switch at the other end and effective to open or to close said electrical circuit.

References Cited

UNITED STATES PATENTS

| | | |
|---|---|---|
| 1,244,110 | 10/1917 | McNary |
| 3,258,549 | 6/1966 | Stoi _____ 200—16 |
| 3,281,818 | 10/1966 | Morgan et al. |
| 2,208,721 | 7/1940 | Demosthenes ____ 200—165 XR |
| 2,412,292 | 12/1946 | Schneider _____ 200—165 XR |
| 2,747,038 | 5/1965 | Perkovich _____ 200—165 XR |
| 3,236,962 | 2/1966 | Schlitz _____ 200—165 XR |
| 3,297,841 | 1/1967 | Campbell _____ 200—165 XR |

ROBERT K. SCHAEFER, Primary Examiner

ROBERT A. VANDERHYE, Asistant Examiner

U.S. Cl. X.R.

200—52, 61.4, 165